T. DANHEISER AND F. F. FECHER.
DUPLICATOR.
APPLICATION FILED OCT. 11, 1917.

1,372,674.

Patented Mar. 29, 1921.
7 SHEETS—SHEET 1.

T. DANHEISER AND F. F. FECHER.
DUPLICATOR.
APPLICATION FILED OCT. 11, 1917.

1,372,674.

Patented Mar. 29, 1921.
7 SHEETS—SHEET 3.

T. DANHEISER AND F. F. FECHER.
DUPLICATOR.
APPLICATION FILED OCT. 11, 1917.

1,372,674.

Patented Mar. 29, 1921.
7 SHEETS—SHEET 6.

UNITED STATES PATENT OFFICE.

THEODORE DANHEISER, OF NEW YORK, AND FREDERICK FRANCIS FECHER, OF BROOKLYN, NEW YORK, ASSIGNORS TO THE BECK DUPLICATOR COMPANY, A CORPORATION OF NEW YORK.

DUPLICATOR.

1,372,674.                Specification of Letters Patent.        Patented Mar. 29, 1921.

Application filed October 11, 1917. Serial No. 196,040.

*To all whom it may concern:*

Be it known that we, THEODORE DANHEISER, a citizen of the United States, and a resident of the borough of Manhattan, in the city and State of New York, and FREDERICK FRANCIS FECHER, a citizen of the United States, and a resident of the borough of Brooklyn, in the city and State of New York, have invented certain new and useful Improvements in Duplicators, of which the following is a specification.

The invention relates to duplicators, more particularly to that form of duplicator in which a negative or reversed impression of matter to be copied is impressed upon an adhesive duplicating surface, and positive impressions taken therefrom by bringing sheets of paper or the like in contact therewith; and has for one of its principal objects to provide simple and comparatively cheap means whereby the rapid handling of said sheets of paper is facilitated.

The invention consists in the novel construction, arrangement and combination of various devices, elements and parts, as shown in the accompanying drawings and hereinafter more particularly described.

In the said drawings.

In carrying our invention into effect in the embodiment thereof shown in Figs. 1 to 4 inclusive, we provide a duplicator of the usual or any suitable type, such as may comprise a base 11 having mounted thereon frame members 12, in which are suitably removably journaled rollers 13 upon which an adhesive duplicating film 14 is adapted to be wound. The duplicating film 14 passes upward and over a bed 16 secured between the members 12, rollers 15 adjacent the ends of this bed being adapted to prevent the film from scraping against the said ends when the rollers 13 are rotated.

Suitable means for rotating the rollers 13, and means for either holding the same against rotation, or permitting such rotation, may also be provided; which means may consist in a crank 17 adapted to be engaged with either roller, ratchets 18 operatively connected with the said rollers 13, pawls 19 adapted to engage with said ratchets, and devices 20 adapted, when desired, to hold said pawls out of operation; all of which means are now known in the art and need not be described in detail. It is thus possible to bring any portion of the duplicating film wound upon the rollers 13 into operative position over the bed 16, and to stretch the same tightly thereover.

Figure 1:
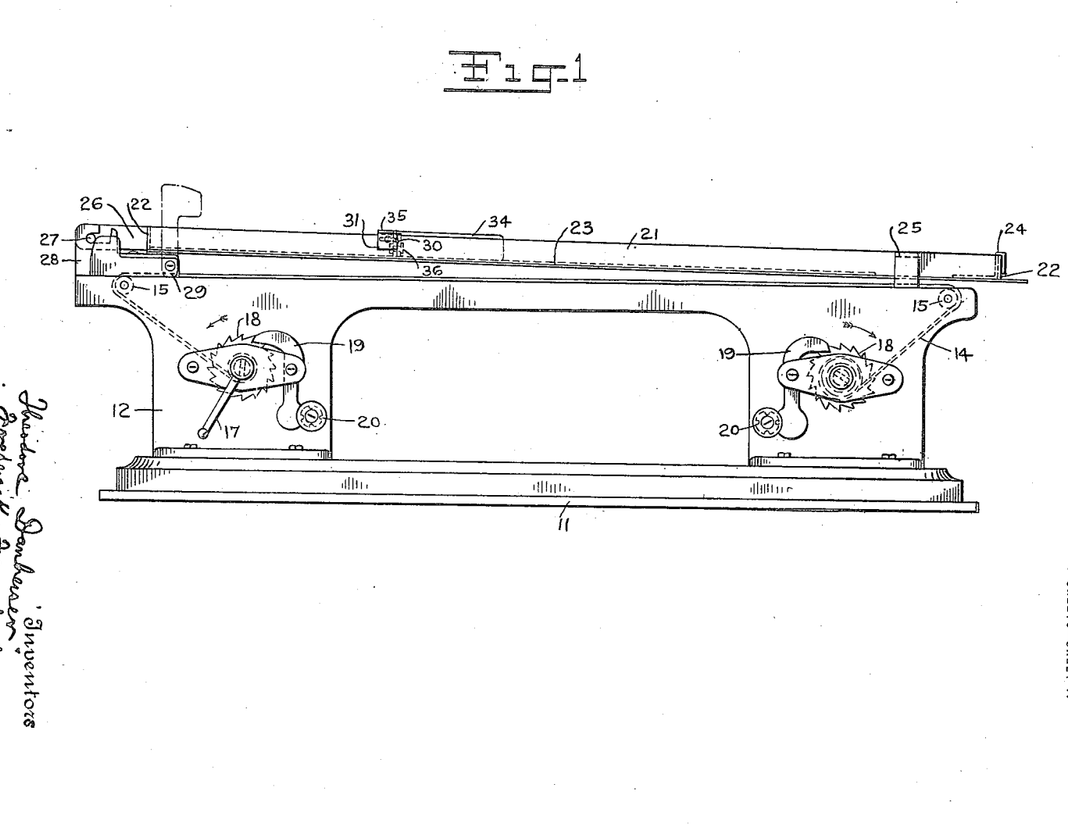
Figure 1 is a side view of one embodiment of our invention.
Figure 2:
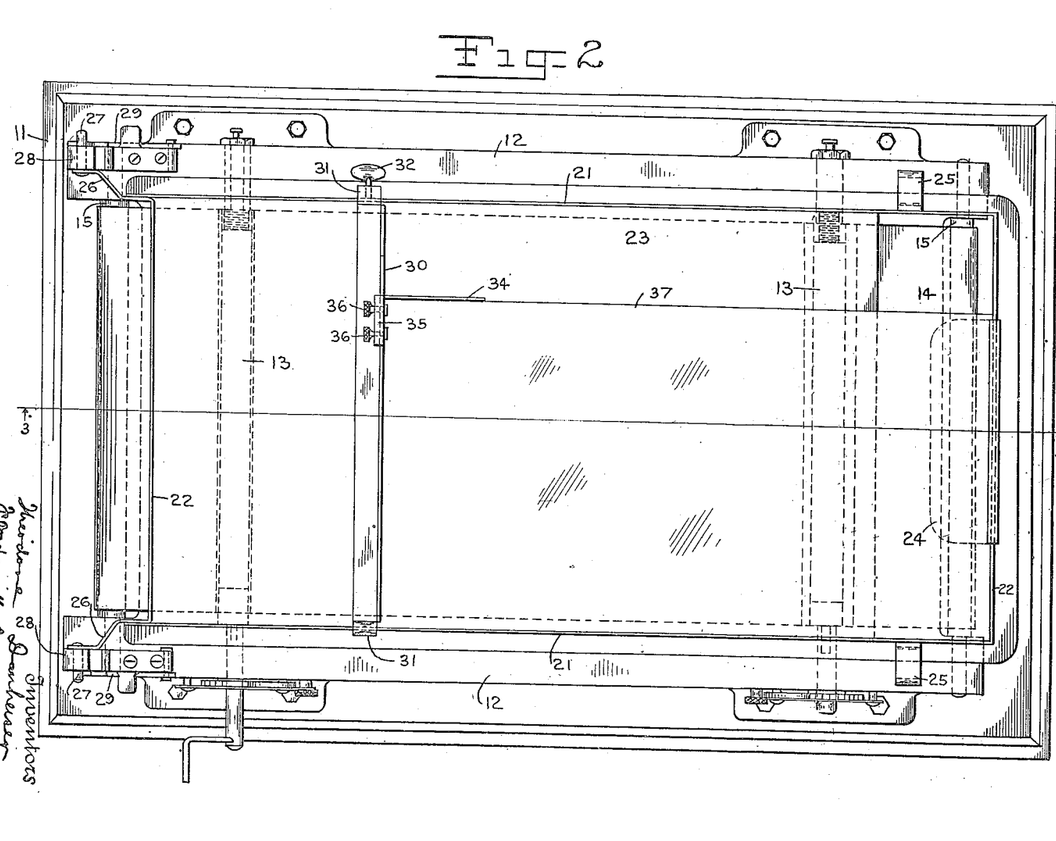
Fig. 2 is a plan view thereof.

Adapted to coöperate with the said duplicator, we provide an attachment comprising a paper support or table member having sides 21, ends 22, and a bottom 23 covering the entire area with the exception of a portion at one end, as will be seen by an inspection of Fig. 2. A bracket 24 attached to one of the ends 22 and level with the bottom 23 of the table extends into the said open part. Members 25 are secured to the sides 21 of the table, near the end provided with the bracket 24, which members 25 are adapted to support this end of the table out of contact with the duplicating medium 14, when the table is in place over the said duplicating medium.

At the other end of the said table from the members 25 and bracket 24 we provide longitudinal extensions 26, (see Fig. 2) which may be integral with the sides 21 of the table, and which bear upon their outer ends laterally extending pins 27. Mounted on each frame member 12, (see Fig. 1) is a member 28 provided with an L-shaped slot adapted to receive one of said pins 27; said members 28 being also provided with latch members 29 pivoted thereto and adapted normally to close the opening of the L-shaped slot and prevent the insertion or withdrawal of a pin 27, but which may be swung out of the way, as illustrated by the dotted lines of Fig. 1, to permit the withdrawal or insertion of a pin 27. It will be observed that when the pins 27 are in place in the closed ends of the L-shaped slots in the members 28, and the members 29 are swung so as to close the said slots, the table will be hinged to the main portion of the duplicator, the end carrying the pins 27 being somewhat higher above the duplicating medium than the other end having the bracket 24 and members 25; but that the table may be easily removed or replaced as desired.

We provide a stop 30 by means of which the length of the working surface of the table may be varied to conform with the size of paper which it is desired to use. This stop is provided with end portions 31 adapted to straddle the sides 21 on which it is adapted to slide longitudinally of the table, and is also provided with a set screw 32 by means of which it may be quickly and easily secured in any position desired. The member 30 and attached parts may be entirely removed from the table if desired.

Figure 4:
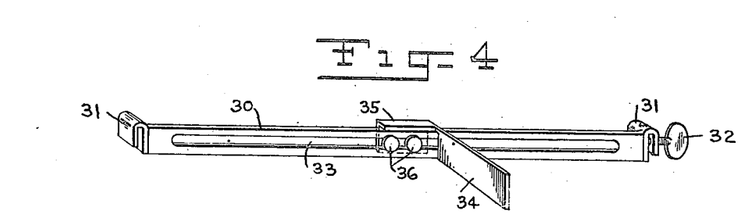
Fig. 4 is a perspective view showing in detail a part of the apparatus, as hereinafter described.

Slidably mounted on the member 30 is a second stop member 34, by means of which the working width of the table may be decreased if desired. This member 34 is provided with a portion 35 adapted to slide along the member 30, to any point on which member 30 it may be secured by means of set screws 36, secured to the portion 35 and working through a slot 33 in the member 30. The member 34 may be removed from the member 30 if desired. Fig. 4 shows the member 30 and attached parts removed from the table.

The operation of the above described embodiment of our invention is as follows: Upon the table or attachment is placed, face downward, a sheet of paper bearing the matter which it is desired to duplicate or copy, and upon this is placed any desired number of sheets of blank paper upon which it is desired to copy the matter transferred from the original to the duplicating medium, so that one end of each of said sheets of paper shall rest against the lower end 22 of the table, and one edge of each of said sheets shall rest against one side 21. The stop 30 and the member 34 are then adjusted in a manner which will be apparent from an inspection of Fig. 2, where a sheet of paper, designated 37, which sheet of paper is less than the full working area of the table, is shown in place thereon. If it is desired to use paper which has the same width as the table, but not the same length, the stop member 34 may be removed from the stop member 30, the stop 30 however being allowed to remain in place, while if it is desired to use paper of the same size as the working area of the table, the stop 30 and all its attached parts may be removed from the said table.

Figure 3:
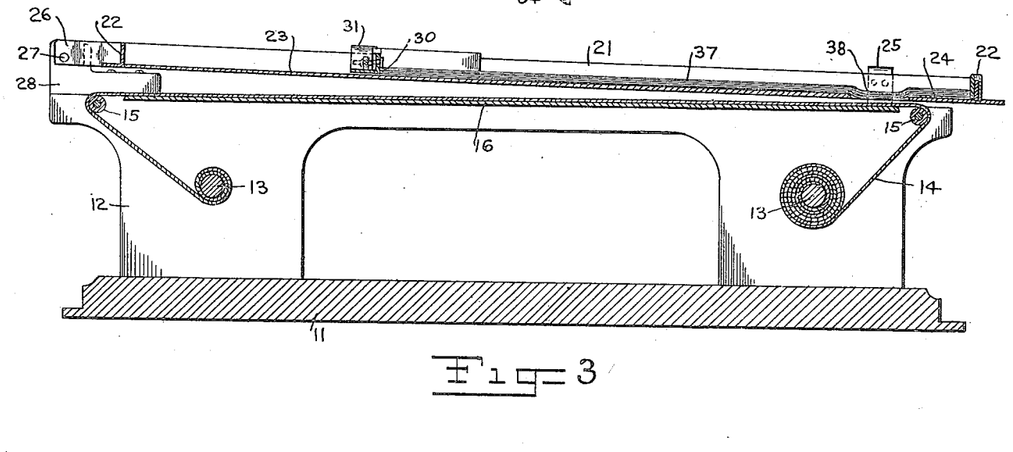
Fig. 3 is a vertical longitudinal section taken on the line 3—3 of Fig. 2.

The original and blank paper being in place, the pile is steadied by placing the hand upon and depressing same down upon the bracket 24, one finger being extended and pressed downward upon the point designated 38 in Fig. 3. The effect of this is to bring the lower end of the lowest sheet of paper in the pile, that is, the original matter to be duplicated, into contact with the adhesive duplicating medium, to which it will adhere. The table being then swung upward, this sheet of paper will be dragged out from under the pile, the upper sheets remaining in place. The table being held in a raised position, pressure may be applied if necessary to the sheet of paper then in place on the duplicating medium, in order to transfer an impression from the same to said medium, the paper then stripped off, the table allowed to resume its lowered position, and the operation repeated with the blank sheets of paper until as many copies as are desired have been made, whereupon a new portion of the duplicating medium may be brought into play, so that when desired a new impression may be transferred thereto, and copies made from the new impression in the manner described.

In carrying our invention into effect in the embodiment thereof shown in Figs. 5 to 10 inclusive, we provide as above described a duplicator of the usual or any suitable type, the one shown in the drawings being substantially similar to that shown in Figs. 1 to 4, and comprising the same parts.

Figure 5:
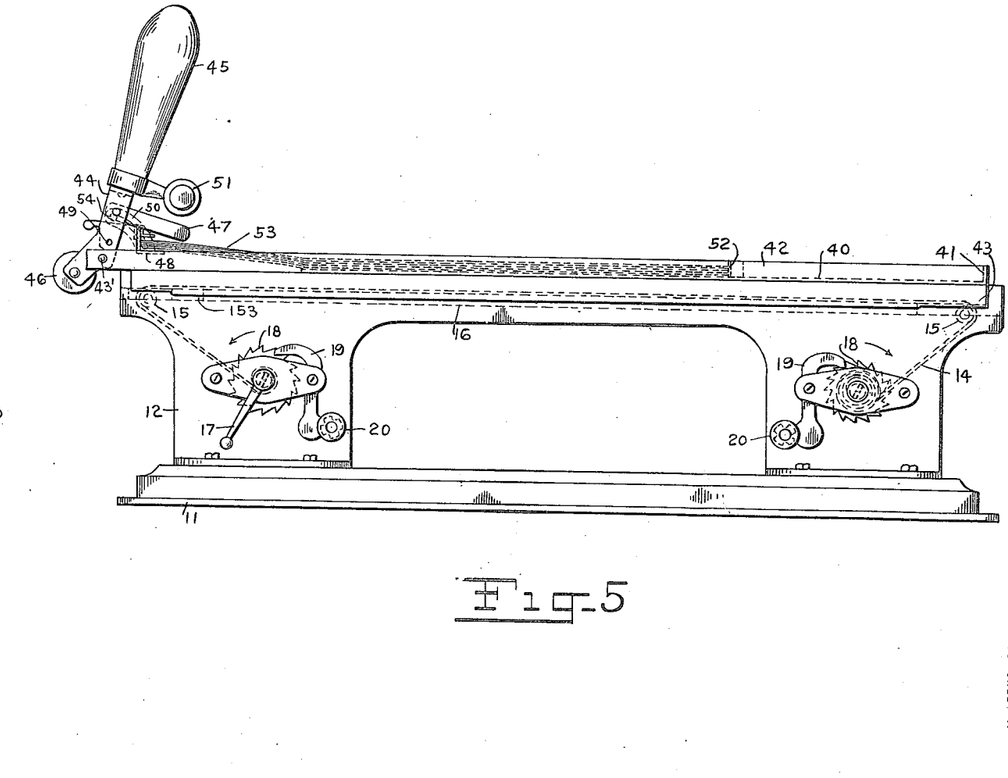
Fig. 5 is a side view of another embodiment of our invention.
Figure 6:
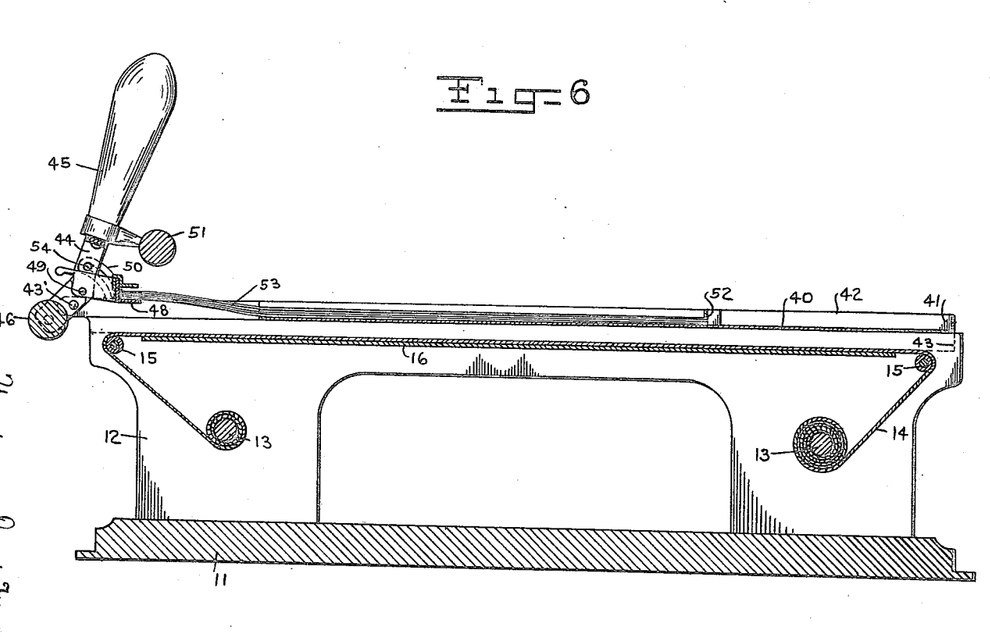
Fig. 6 is a longitudinal vertical section taken on the line 6—6 of Fig. 7 and looking in the direction of the arrows.
Figure 7:
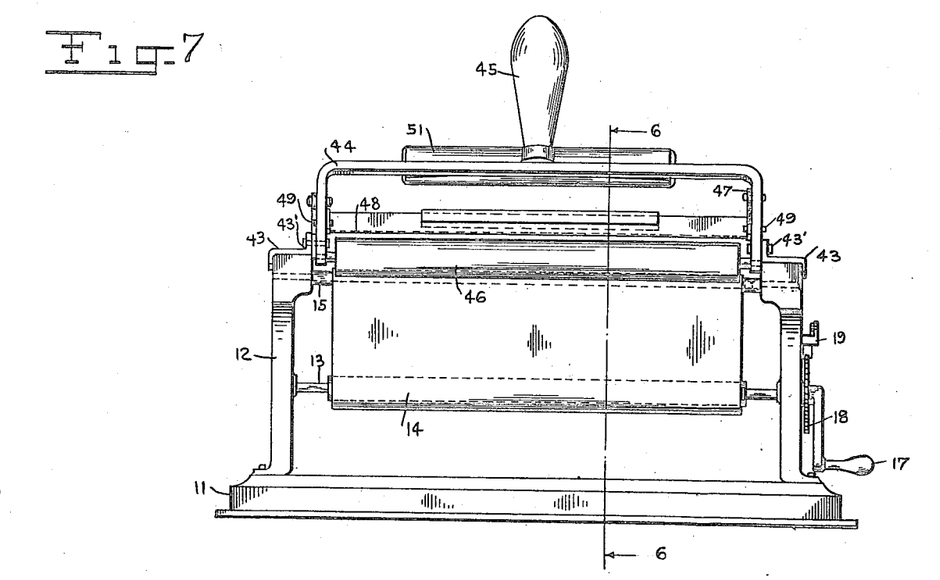
Fig. 7 is an end view looking from the left of Fig. 5.
Figure 8:
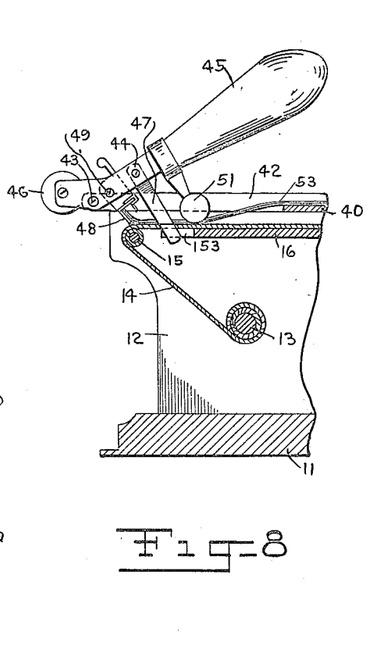
Figs. 8, 9, and 10 are views of the portions of the apparatus shown at the left of Fig. 6, showing the parts in various positions.
Figure 9:
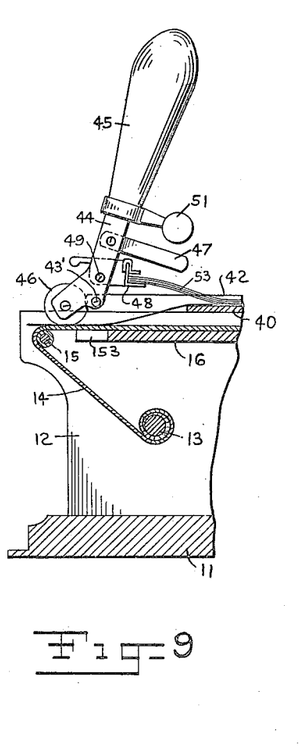
Figure 10:
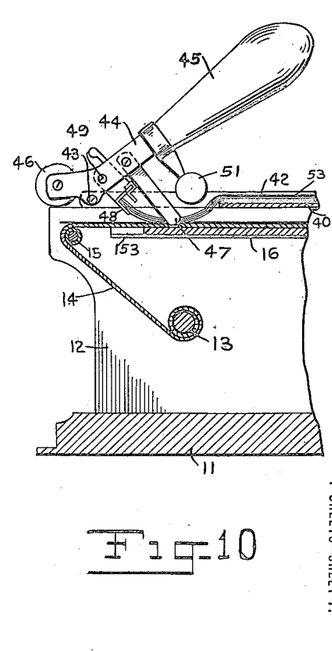

A paper support or table is slidably mounted on the duplicator by means of flanged members 43 attached to said table. (See Fig. 7). The table comprises a bottom 40, and end 41, and sides 42 projecting beyond the left hand end of the bottom 40 as shown in Figs. 5 and 6. Pivoted at 43' in the free ends of these sides 42 is a U-shaped frame 44 provided with a handle 45, and having an impression roller 46 journaled in its lower end.

At one side of the frame 44 is secured a laterally extending finger 47. A paper support or shelf 48 is pivoted at points 49 on the frame 44, and is provided on one side (see Fig. 5) with a slotted arc-member 50 by means of which its position may be adjusted, the member 50 being secured in any position desired by means of a screw or the like 54. A paper depressing member 51 is secured to the frame 44, which depressing member 51 may if desired be, but is not necessarily, a roller. Means 52, analogous to the member 30 and attached parts of Fig. 4, may be provided for the purpose of restricting the operative area of the bottom 40 of the paper support or table.

In the operation of this embodiment of our invention, the attachment being in place upon the duplicator, and the parts in the position shown in Figs. 5 and 6, a sheet of paper bearing the matter which it is desired to copy is placed face downward upon the table, and upon this are placed any desired number of sheets of paper upon which it is desired to copy the matter transferred from the original to the duplicating medium, so that one end of the pile shall rest upon the support 48, the devices 52 being adjusted in the proper manner. The handle 45 is then moved toward the right in Fig. 5, until the devices occupy the position shown in Fig. 8. When in this position the finger 47 enters a depression 153 in the bed 16, or may clear the end of the said bed, and the depressing member 51 forces the pile of paper downward, so that the sheet on the bottom of the pile will be brought into contact with the duplicating surface and will adhere thereto. The parts are then moved into the position shown in Fig. 9, leaving the sheet on the bottom of the pile adhering to the duplicating surface at one end, the remaining sheets being in their original position. The handle 45 being held in the position shown in Fig. 9, the attachment as a whole is moved toward the right in Fig. 5, withdrawing the undermost sheet of paper of the pile from the support or table, and bringing same into contact with the duplicating medium, whereby an impression is transferred from said sheet to said medium by means of the impression roller 46. After the attachment has been moved to its extreme right hand position, and approximately all of the paper has been passed over by the impression roller, the handle 45 and attached parts are moved into the position relative to the horizontal shown in Fig. 10, in which position the impression roller 46 is raised above the paper, enabling the said paper to be removed. The handle 45 being held in the position shown in Fig. 10, the attachment is returned to its original position, the finger 47 bearing upon the bed 16 and holding the paper depressing member 51 out of contact with the duplicating medium. The attachment being returned to the position shown in Fig. 8, the process may be repeated as often as desired, in this case, however, resulting in transferring impressions from the duplicating medium to the blank sheets of paper.

The advantages of our invention will be obvious. We may particularly enumerate the cheapness of construction, the ease of operation, and the fact that each impression will be printed upon the same relative portion of its respective paper. We do not limit ourselves to the exact forms described, as it will be evident that various other modifications might be made, without departing from the spirit and scope of the said invention.

Having thus described our invention, what we claim as new and desire to secure by Letters Patent is as follows:

1. The combination with a duplicator comprising an adhesive duplicating medium adapted to receive an impression and to transfer same; of a paper supporting member adapted to support a plurality of sheets of paper or the like mounted on said duplicator and provided with an opening in the bottom adapted to permit a portion of the lower one of said sheets of paper to be depressed so as to come in contact with said adhesive duplicating medium.

2. The combination with a duplicator comprising an adhesive duplicating medium adapted to receive an impression and to transfer same; of a paper supporting member adapted to support a plurality of sheets of paper or the like movably mounted on said duplicator and provided with an opening in the bottom adapted to permit a portion of the lower one of said sheets of paper to be depressed so as to come in contact with said adhesive duplicating medium.

3. The combination with a duplicator comprising an adhesive duplicating medium adapted to receive an impression and to transfer same; of a paper supporting member adapted to support a plurality of sheets of paper or the like pivotally mounted on said duplicator and provided with an opening in the bottom adapted to permit a portion of the lower one of said sheets of paper to be depressed so as to come in contact with said adhesive duplicating medium.

4. The combination with a duplicator comprising a duplicating medium adapted to receive an impression and to transfer same, of a member movably mounted on said duplicator, comprising means adapted to support the marginal portions of a plurality of sheets of paper or the like and to permit a portion of the lower one of said sheets intermediate said marginal portions to be depressed into contact with said duplicating medium.

5. The combination with a duplicator comprising a duplicating medium adapted to receive an impression and to transfer same, of a member pivotally supported on said duplicator, comprising means adapted to support the marginal portions of a plurality of sheets of paper or the like, and to permit a portion of the lower one of said sheets intermediate said marginal portions to be depressed into contact with said duplicating medium.

6. The combination with a duplicator comprising a duplicating medium adapted to receive an impression and to transfer same; of a member movably supported on said duplicator comprising means adapted to support the marginal portions of a plurality of sheets of paper or the like and to permit a portion of the lower one of said sheets intermediate said marginal portions to be depressed into contact with said duplicating medium and adapted when moved with reference to said duplicating medium to permit said lower sheet to escape but to retain all the other said sheets.

7. The combination with a duplicator comprising a duplicating medium; of an attachment therefor comprising a paper supporting member movably mounted on said duplicator adapted to support a plurality of sheets of paper or the like, and permit a portion of the lower one of said sheets of paper or the like to come in contact with said duplicating medium, whereby the lower of said sheets of paper or the like is withdrawn from said paper supporting member and allowed to fall upon said duplicating medium when said paper supporting member is moved.

In witness whereof we have hereunto signed our names this 13th day of September 1917, and the 19th day of September, 1917, respectively.

THEODORE DANHEISER.
FREDERICK FRANCIS FECHER.